Patented Mar. 31, 1942

2,278,355

UNITED STATES PATENT OFFICE 2,278,355

METHOD OF IMPROVING THE ADHESION OF RUBBER TO FABRICS

Edward T. Lessig and Ivan Gazdik, Akron, Ohio, assignors to The B. F. Goodrich Company, New York, N. Y., a corporation of New York No Drawing. Application February 27, 1939, Serial No. 258,730

5 Claims. (Cl. 154—40)

This invention relates to the adhesion of rubber to natural and synthetic organic fibrous materials such as cotton, silk, or artificial silk in the form of cords, fabrics, and the like.

The length of service of many articles of commerce embodying rubber and natural or artificial cords and fabrics such as tires and belts, for instance, is largely dependent upon the degree of adhesion obtained between the rubber and the cord. The industrial importance of such articles has led to a continual search for methods of increasing said adhesion. It is an object of this invention, accordingly, to provide a method whereby improvement in adhesion between rubber and natural or artificial fibers may be obtained.

We have discovered that by treating natural or artificial cords with an azo aromatic compound, the adhesion to rubber is greatly improved. The preferred azo compounds have the structure

$$R'-N=N-R''$$

wherein $R'$ and $R''$ are the same or different aromatic radicals such as phenyl, tolyl (ortho, meta, or para), cumyl, cymyl, aminophenyl, hydroxyphenyl, anisyl, isopropoxyphenyl or corresponding naphthyl, xenyl, indyl, anthryl, phenanthryl, etc., groups. Among the preferred compounds of this invention are azo benzene, benzene-azo beta-naphthol, benzene azo ortho-cresol, para-hydroxy azo benzene, para-isopropoxy azo benzene, and para-amino azo benzene. Compounds in which the nitrogen groups are substituted by hydrogen instead of being connected by a double bond such as hydrazo benzene are within the broad scope of the invention and often give good results, though they do not in general produce as great improvement in adhesion as that produced by the preferred azo compounds.

In a specific embodiment of this invention, cotton tire cord was wet with 5% solutions of azo aromatic compounds, dried under tension sufficient to stretch the cord to about its original length, and tested for adhesion to rubber by vulcanizing rubber containing the cord, cutting from the rubber cylindrical samples in which the cord was diametrically disposed, and compressing the cylinders in a Tinius-Olsen testing machine until separation occurred between the cord and the rubber. The following results were obtained:

| Compound used | Increase in adhesion |
|---|---|
| | Per cent |
| Benzene azo beta-naphthol in benzene | 40 |
| Benzene azo ortho-cresol in alcohol | 41 |
| Para-isopropoxy azo benzene in benzene | 26 |
| Para-hydroxy azo benzene in alcohol | 28 |
| Para-amino azo benzene in benzene | 36 |
| Hydrazo benzene in alcohol | 16 |

When rayon was substituted for cotton in the benzene azo beta-naphthol treatment above, the adhesion was increased 51% over that obtained between vulcanized rubber and untreated rayon.

Although we have herein disclosed specific embodiments of our invention, we do not intend to limit ourselves solely thereto, for it will be obvious to those skilled in the art that many modifications are within the spirit and scope of the invention as defined in the appended claims.

We claim:

1. Vulcanized rubber strongly adhered to a member of the class consisting of natural and synthetic organic fibers on the surface of which is an azo aromatic compound.

2. Vulcanized rubber strongly adhered to cotton on the surface of which is an azo derivative of an aromatic compound of the benzene series.

3. The method of adhering rubber to a member of the class consisting of natural and synthetic organic fibers which comprises treating said fiber with an azo aromatic compound, associating the fibers with vulcanizable rubber, and vulcanizing the rubber.

4. The method of adhering rubber to cotton which comprises wetting the cotton with a solution of an azo derivative of an aromatic compound of the benzene series, drying said cotton, associating the cotton with vulcanizable rubber, and vulcanizing the rubber.

5. The method of adhering rubber to cotton cord which comprises wetting said cord with a solution of an azo derivative of an aromatic compound of the benzene series, drying said cord under tension, associating the cotton with vulcanizable rubber, and vulcanizing the rubber.

EDWARD T. LESSIG.
IVAN GAZDIK.